US006296183B1

(12) United States Patent
Clark (10) Patent No.: US 6,296,183 B1
(45) Date of Patent: *Oct. 2, 2001

(54) TELEPHONY SYSTEM FOR SMART CARD USAGE

(75) Inventor: Theresa A. Clark, Superior, CO (US)

(73) Assignee: Qwest Communications Int'l., Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,361

(22) Filed: Dec. 23, 1997

(51) Int. Cl.$^7$ ........................................... G06K 5/00
(52) U.S. Cl. ............................................ 235/380; 235/381
(58) Field of Search ................................... 235/380, 381, 235/492, 375; 379/91.01, 93.06, 93.02, 93.12, 93.07, 93.23, 453

(56) References Cited

U.S. PATENT DOCUMENTS

| 4,138,599 | * | 2/1979 | Munter | 179/175 |
| 4,707,592 | * | 11/1987 | Ware | 235/379 |
| 4,907,257 | * | 3/1990 | Asano et al. | 379/144 |
| 4,961,142 | * | 10/1990 | Elliott et al. | 364/408 |
| 5,046,183 | * | 9/1991 | Dorst et al. | 370/110.1 |
| 5,305,383 | * | 4/1994 | Guillou et al. | 380/24 |
| 5,311,595 | * | 5/1994 | Bjerrum et al. | 380/25 |
| 5,351,296 | * | 9/1994 | Sullivan | 380/24 |
| 5,436,971 | | 7/1995 | Armbrust et al. | 380/23 |
| 5,475,740 | | 12/1995 | Biggs, Jr. et al. | 379/91 |
| 5,501,608 | * | 3/1996 | Scheer et al. | 439/218 |
| 5,511,114 | * | 4/1996 | Stimson et al. | 379/114 |
| 5,524,134 | * | 6/1996 | Gustafson et al. | 379/58 |
| 5,550,917 | * | 8/1996 | Tallec | 379/442 |
| 5,557,668 | | 9/1996 | Brady | 379/212 |
| 5,563,937 | | 10/1996 | Bruno et al. | 379/201 |
| 5,588,037 | | 12/1996 | Fuller et al. | 379/57 |
| 5,619,559 | | 4/1997 | Kennedy | 379/91 |
| 5,650,761 | * | 7/1997 | Gomm et al. | 235/381 |
| 5,661,284 | | 8/1997 | Freeman et al. | 235/380 |
| 5,673,299 | | 9/1997 | Fuller et al. | 379/57 |
| 5,673,306 | | 9/1997 | Amadon et al. | 379/59 |
| 5,675,627 | * | 10/1997 | Yaker | 379/57 |
| 5,677,955 | | 10/1997 | Doggett et al. | 380/24 |
| 5,796,832 | * | 8/1998 | Kawan | 380/24 |

OTHER PUBLICATIONS

Smart Card Handbook, W. Rankl and W.Effing, John Wiley and Sons, Copyright 1997.*
Smart Cards, Seizing Strategic Business Opportunies, C. Allen and W. Barr, McGraw–Hill, Inc., Copyright 1997.*
Partington, George, "A microchip in a plastic card," May 1997.

* cited by examiner

Primary Examiner—Karl D. Frech
(74) Attorney, Agent, or Firm—Marsh, Fischmann & Breyfogle, LLP (57) ABSTRACT

An improved public telephone system for providing telephony service access. In particular, the improved public telephone provides for telephony service access responsive to the use of any of a plurality of types of smart cards, each of the plurality of types of smart cards corresponding with a different one of a plurality of financial institutions. Such enhanced access is provided through the utilization of a plurality of security access modules, each of the plurality of security access modules corresponding with a different one of the financial institutions.

20 Claims, 5 Drawing Sheets

TELEPHONY SYSTEM FOR SMART CARD USAGE

FIELD OF THE INVENTION

The present invention relates to telephony systems, and more particularly, to the use of smart cards for gaining access to telephony services.

BACKGROUND OF THE INVENTION

As the range of telephony-related service capabilities continues to increase, so to does the reliance thereupon. Concomitantly, there are also increased expectations in business and personal relations as to the timeliness of returning messages and/or and otherwise maintaining personal contact on an ongoing basis.

As can be appreciated, however, there are many situations in which access to telephony services is limited, thereby restricting an individual's capability for timely response. By way of primary example, telephone access is limited when a user is at a location remote from the user's primary telephony equipment. In such instances, the user may only have access to telephony services via the use of public telephones. Frequently, a user will not have the necessary currency to utilize a public telephone, particularly, for example, in the event long distance calling is desired.

To help address such situations, "smart cards" have been developed for gaining telephony service access from a public telephone. In short, a smart card is one that is adapted for insertion into certain public telephones, such telephones being capable of accessing encoded information carried on a microchip within the card. The encoded information allows the smart card holder, upon input of a personal identification number, to receive telephony services to the extent that encoded telephony credit units cover associated calling charges. Additional calling credit units may be purchased at smart card telephones via interface with a specific financial institution and telephony service provider.

Unfortunately, the potential use of smart cards is currently restricted by the fact that any given smart card-compatible telephone can only access one particular type of smart card (i.e., a smart card issued with the cooperative authorization of a single, specific financial institution and telephony service provider).

SUMMARY OF THE INVENTION

A primary objective of the present invention is to enhance smart card access to telephony services. More particularly, an objective of the present invention is to improve access by providing a more convenient approach for the provision of smart card-based telephony services.

An additional objective of the present invention is to increase telephony equipment efficiencies and location coverage via dual functionality at smart-card compatible telephones.

The above objectives and additional advantages are realized in accordance with the present invention which provides telephony service access at a public telephone, responsive to the use of any of a plurality of types of smart cards, each of said plurality of types of smart cards corresponding with a different one of a plurality of financial institutions. In this regard, it will be understood that, for any given smart card, there is typically a single, corresponding financial institution that has issued or otherwise authorized the smart card in conjunction with a corresponding telephony service provider. By way of example, in use of the present invention, a public telephone may utilize one of a plurality of security access modules to access data in a microchip embedded in a first given smart card issued by a first financial institution. Subsequently, another of the security access modules may be utilized to access data in a microchip embedded in a second given smart card issued by a second financial institution. As will be appreciated, the provision of a plurality of security access modules in one-to-one relation with a corresponding plurality of types of smart cards (i.e., each being issued/authorized by a different financial institution), allows a variety of smart card types to be utilized at the public telephone, thereby enhancing convenience and calling options for smart card holders.

To provide access to differing types of smart cards, each of the plurality of security access modules utilized in the present invention is responsive to a different security access protocol. While the access protocols differ, the modules may all interface with a common transceiver that interfaces with the microchip of a given smart card utilized at the public phone.

To facilitate smart card usage, the public telephone may further comprise a user interface for prompting a user to select one of a plurality of functions. Such functions may include placement of a telephony call utilizing smart card credit units stored in the smart card microchip to cover associated charges. Such functions may also include the purchase of additional smart card calling units. The public phone may be further provided with appropriate user input mechanisms for function selection by a smart card user.

In order to complete a purchase of additional smart card calling units, the public telephone may be operable to employ accessed data (i.e., from an embedded microchip) to complete a purchase authorization request that is transmitted to a financial institution. Pursuant to obtaining authorization of the purchase authorization request, the public phone may be further operable to automatically transmit a request to a telephony service provider (i.e., corresponding with a given smart card) for loading of smart card units. Upon such authorization, the public phone may then access the microchip of the corresponding smart card to load the authorized smart card units thereinto.

Numerous additional aspects and advantages will become apparent in the description that follows.

DETAILED DESCRIPTION

Figure 1A:
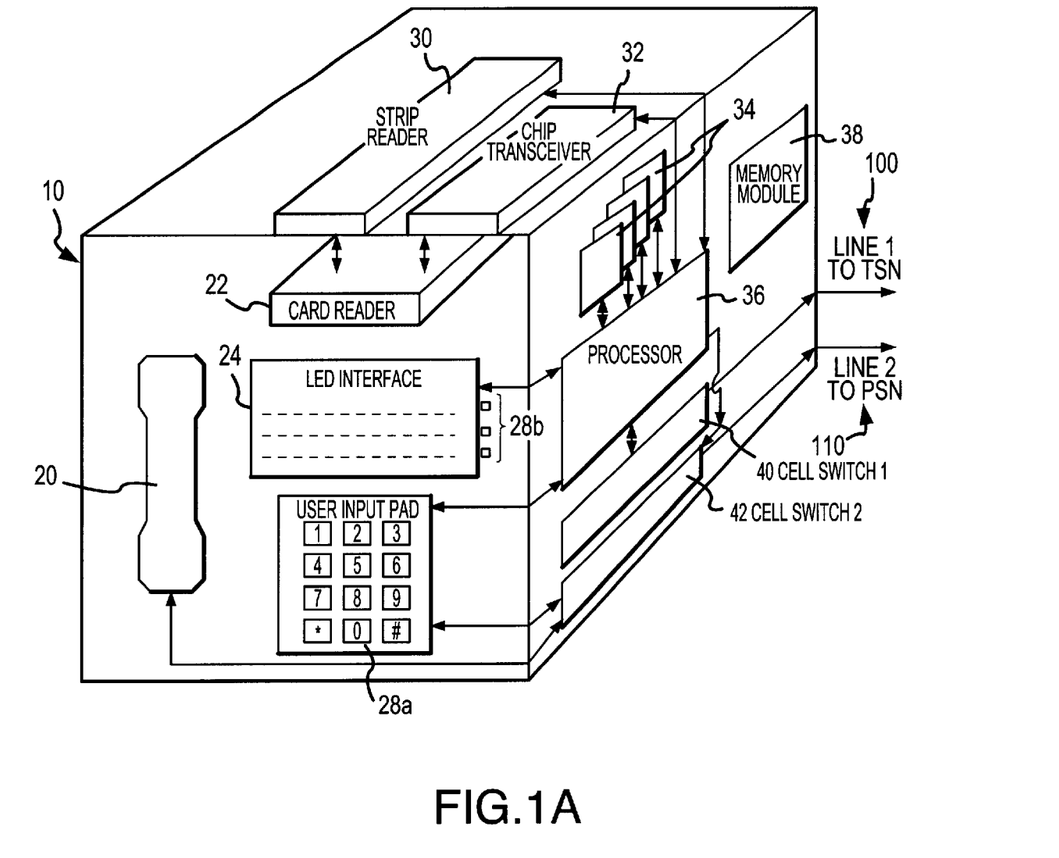
FIG. 1A illustrates one embodiment of a public telephone comprising the present invention.

The public telephone embodiment illustrated in FIG. 1A comprises a number of user-interactive components generally positioned on an external face of a smart card-compatible public telephone 10, as well as a number of internal components housed for restrictive access within the public telephone 10. As will be farther described, public telephone 10 further includes at least two communication service lines, a first line 100 interconnecting the public telephone 10 for communications to/from a transaction services network (TSN), and a second line 110 for communications to/from a public telephony switching network (PSN).

As illustrated in FIG. 1A, the user-interactive components of public telephone 10 include a hand-held unit 20 for voice input/audible output communications, a card reader 22 for receiving a smart card inserted by a user, an LED user interface 24 for prompting the input of instructions by and providing information to a user, and a user input pad 28a for the input of instructions by a user. User input push buttons 28b may also be provided in spatial relation to the display lines of LED interface 24. Currency insert assembly 19 is also included for normal pay phone call services. As will be further described, the user-interactive components are interconnected with the internal components of public telephone 10 to carry out desired smart card-related communications and smart card unit purchase transactions in a manner that provides improved convenience and overall enhanced telephony service access to users.

The internal components of public telephone 10 include a microchip transceiver 32 for interfacing with a microchip embedded in a smart card inserted into the card reader 22. Such microchip may contain encoded data, including a corresponding preregistered PIN #, a corresponding financial institution identifier, a corresponding account identifier, and corresponding information as to the amount of available telephony service credit units (i.e., smart card calling units) that may be utilized for telephony services. A magnetic strip reader 30 may also be provided for reading information from a magnetic strip on a smart card inserted into card reader 22 (e.g., PIN #, financial institution identifier, and account identifier).

Of particular importance, chip transceiver 32 is interconnected with a plurality of security access modules $34_{1\ to\ 4}$. Each of the security access modules $34_{1\ to\ 4}$ corresponds with a separate one of a plurality of different financial institutions who have authorized/issued smart cards (e.g., in conjunction with a given telephony service provider). In this regard, it should be appreciated that each such financial institution may have a separate, predetermined access protocol that is preprogrammed into or otherwise known by a corresponding one of the security access modules $34_{1\ to\ 4}$ in order for the chip transceiver 32 to access the microchip in a smart card authorized by such financial institution. As such, upon insertion of a particular smart card into card reader 22, a corresponding security module $34_{1\ to\ 4}$ will transmit a signal to transceiver 32 comprising a proprietary data code or protocol that permits transceiver 32 to access the microchip of the smart card so as to read the encoded data stored therein. As will be appreciated, the inclusion of a plurality of security modules $34_{1\ to\ 4}$ in phone 10 yields enhanced convenience to, and increased usage options, for smart card holders.

The smart card-compatible phone 10 further comprises a processor 36 and associated memory module 38, the processor 36 being interconnected to the various user-interactive components and internal components described above. Processor 36 controls and coordinates the functionality of the components in a pre-programmed manner. Such control and coordination will be reflected in the description of operations that follow.

Public telephone 10 also comprises at least two communication transceivers, or call switches, 40 and 42 for conducting communications via line 100 with a transaction services network (TSN) and communications via line 110 with a public switching network (PSN), respectively. Communications line 110 is utilized for completing a call to a station number as may be entered by a smart card user. Communications line 100 is utilized when a smart card holder desires to purchase additional calling units for loading by transceiver 32 into the microchip of smart card at phone 10.

Figure 1B:
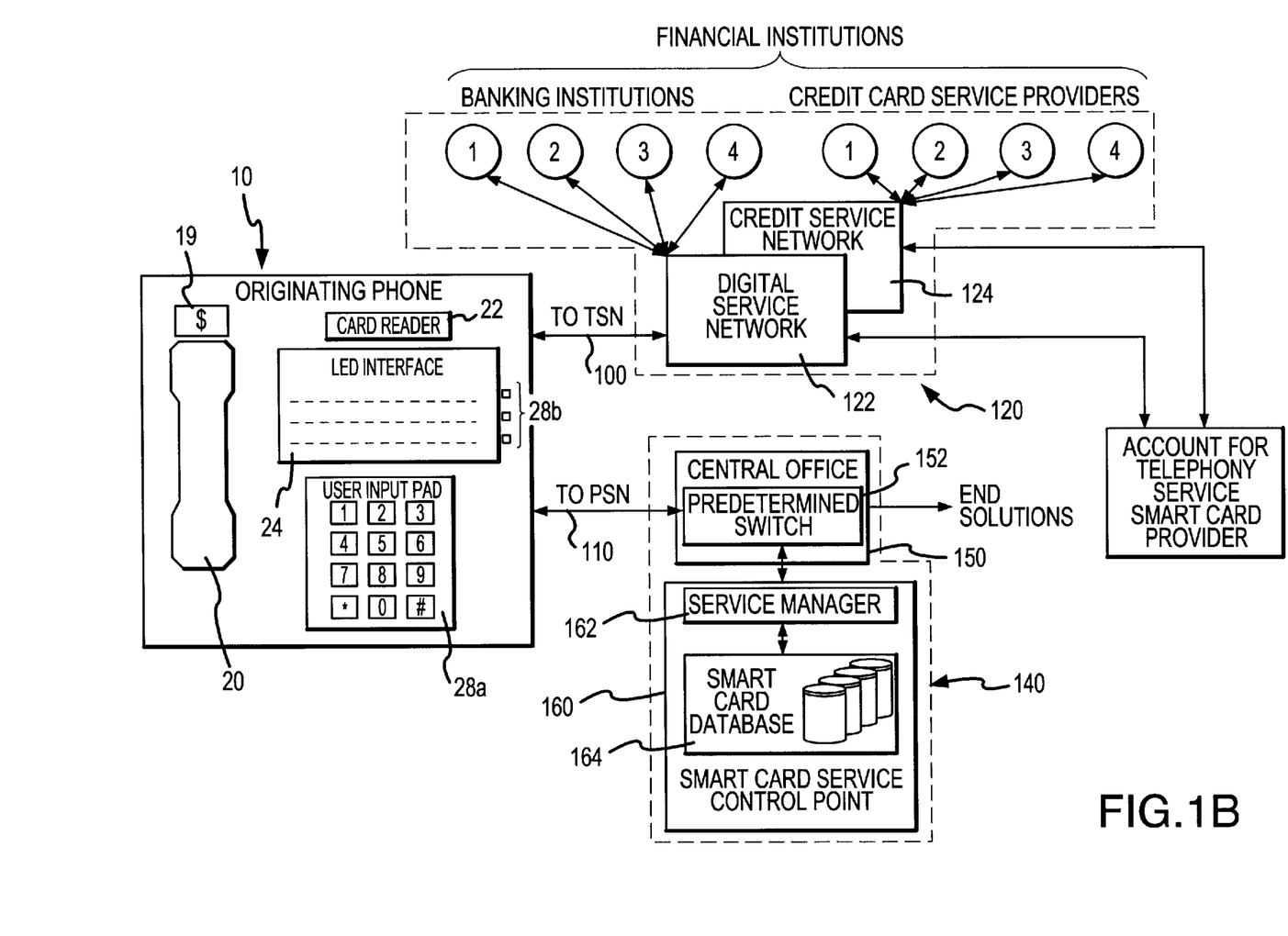
FIG. 1B illustrates a system embodiment comprising the public telephone embodiment of FIG. 1A.

More particularly, and referring now to FIG. 1B, communications line 100 provides for the output/input of messages to/from a transaction services network 120, that may comprise debit and credit service networks 122 and 124, respectively. The debit service network 122 is interconnected with a plurality of banking institutions for authorizing the purchase of smart card units via a debit transaction at originating phone 10. Similarly, the credit service network 124 is interconnected with a plurality of credit providers for authorizing the purchase of smart card units via a credit transaction at originating phone 10. For any given purchase of smart card units at originating phone 10, the transaction services network 120 will operate so as to seek transaction authorization from the banking or credit institution corresponding with the smart card utilized at the originating phone 10. For purposes hereof, the banking institutions and credit institutions that are interconnected with the debit service network and credit service network 122 and 124, respectively, are collectively referred to as financial institutions.

The processor 36 of originating phone 10 is preprogrammed such that, for any given smart card unit purchase transaction conducted at originating phone 10, a transaction request message will be transmitted over line 100 to the transaction services network 120. Such transaction request record will comprise a data portion identifying the particular financial institution corresponding with the transaction, a user account number at the corresponding financial institution, an account transaction identifier (i.e., such identifier corresponding with the particular checking, savings or credit account with respect to which charges are to be authorized against), and a data portion indicating the desired transaction amount to be authorized (e.g., as specified by a denomination-specific instruction input at phone 10). Upon authorization of a given transaction by the corresponding financial institution, a transaction record including transaction authorization data will be transmitted back to originating phone 10 via line 120. Such transaction authorization data is storable in memory 38 (e.g., for subsequent settlement at the end of each day).

Processor 36 is preprogrammed so that, upon receipt of a transaction authorization message from transaction service network 120, the corresponding transaction will be continued via interface with a telephony service network 140. For such purpose, and as noted, phone 10 is interconnected via line 110 to the telephony service network 140. In particular, telephony network 140 comprises one or more central office 150 which includes a predetermined smart card service switch 152 for receiving calls from originating phone 10. In this regard, it will be appreciated that telephony network 140 may comprise a number of central offices having one or more predetermined smart card service switches for receiving smart card service request calls.

The predetermined smart card service switch 152 corresponds with a predetermined telephone number resident in the memory module 38 at originating phone 10, wherein when a smart card unit purchase transaction is initiated at originating phone 10, and authorized via interface with transaction service network 120, processor 36 is operable to cause call switch 42 to call the predetermined smart card service number corresponding with the predetermined smart card switch 152 at central office 150. As will be appreciated, both the predetermined switch 152 and corresponding predetermined telephone number may correspond with a given telephony service provider (i.e., a provider offering smart card calling services pursuant to the use of a given smart card at phone 10). In this regard, predetermined switch 152 may advantageously comprise AIN (Advanced Intelligent Network) switching capabilities wherein, upon the receipt of a call, switch 152 will suspend call processing and launch a message to a smart card service control point 160 maintained by a smart card calling service provider in telephony network 140. It should be noted that a plurality of different predetermined switches 152 may be utilized in the present invention, each of such switches corresponding with a common service control point 160 maintained by a single smart card telephony service provider. Further, it is noted that a plurality of different switches 152 could also be provided in corresponding relation to a plurality of different service control points 160 maintained by different smart card telephony service providers in network 140 (e.g., each provider having a different corresponding service number stored at phone 10 for automatic dialing upon use of a corresponding smart card.

The exemplary service control point 160 shown in FIG. 1 includes a service manager 162 and a smart card database 164. The database 164 includes smart card account information, including for each smart card account number, information regarding authorized smart card purchase transactions, corresponding PIN #s, etc. for operation in a conventional manner. In short, smart card service control point 160 is operable to receive smart card unit purchase request messages from an originating phone 10, and to enable phone 10 to load the purchased units into a given smart card microchip (e.g., pursuant to PIN # clearance and transaction accounting in database 164). As will be appreciated, service control point 160 may be software-driven.

Figure 2A:
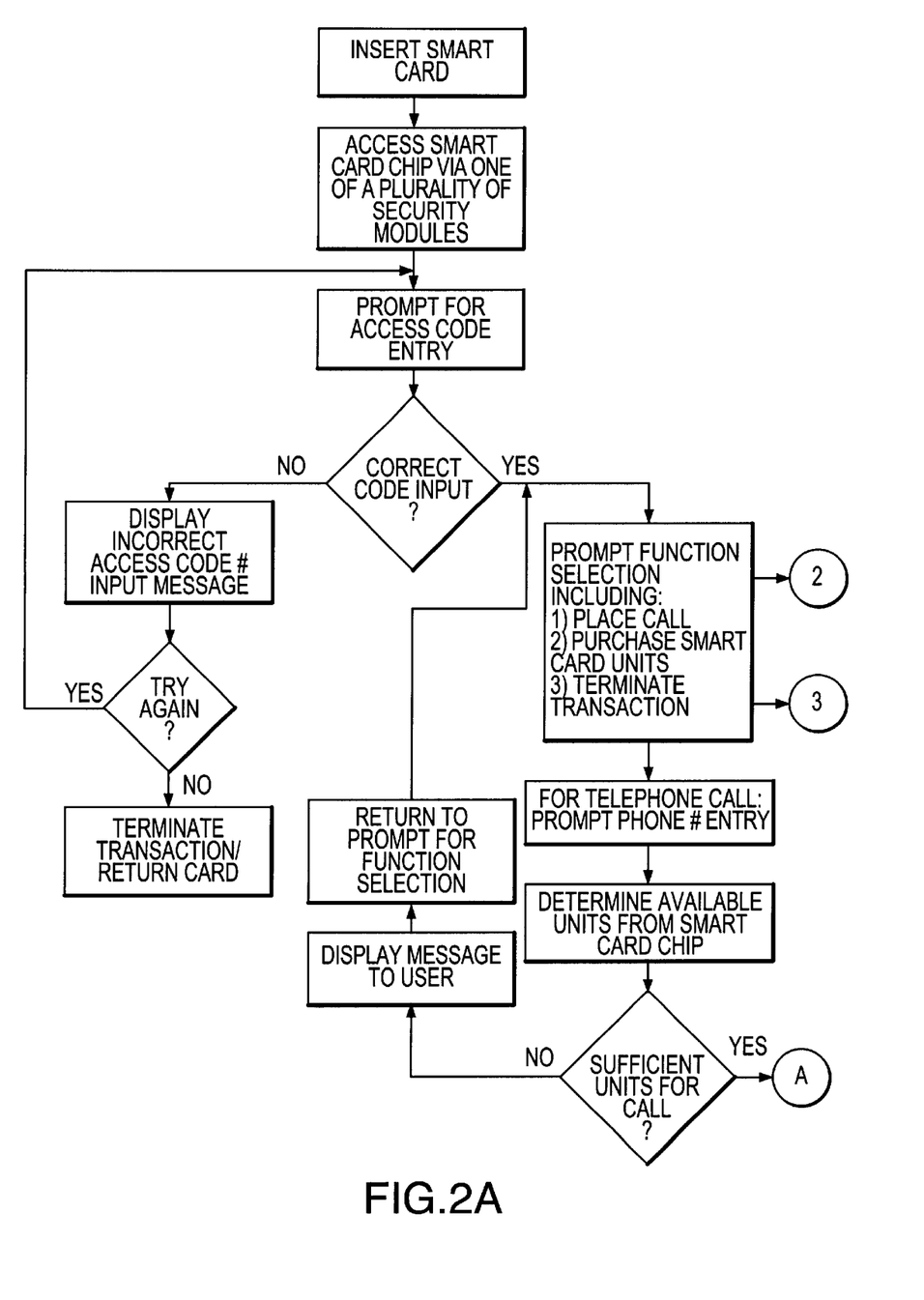
FIGS. 2A–2D illustrate one process embodiment of the present invention.
Figure 2B:
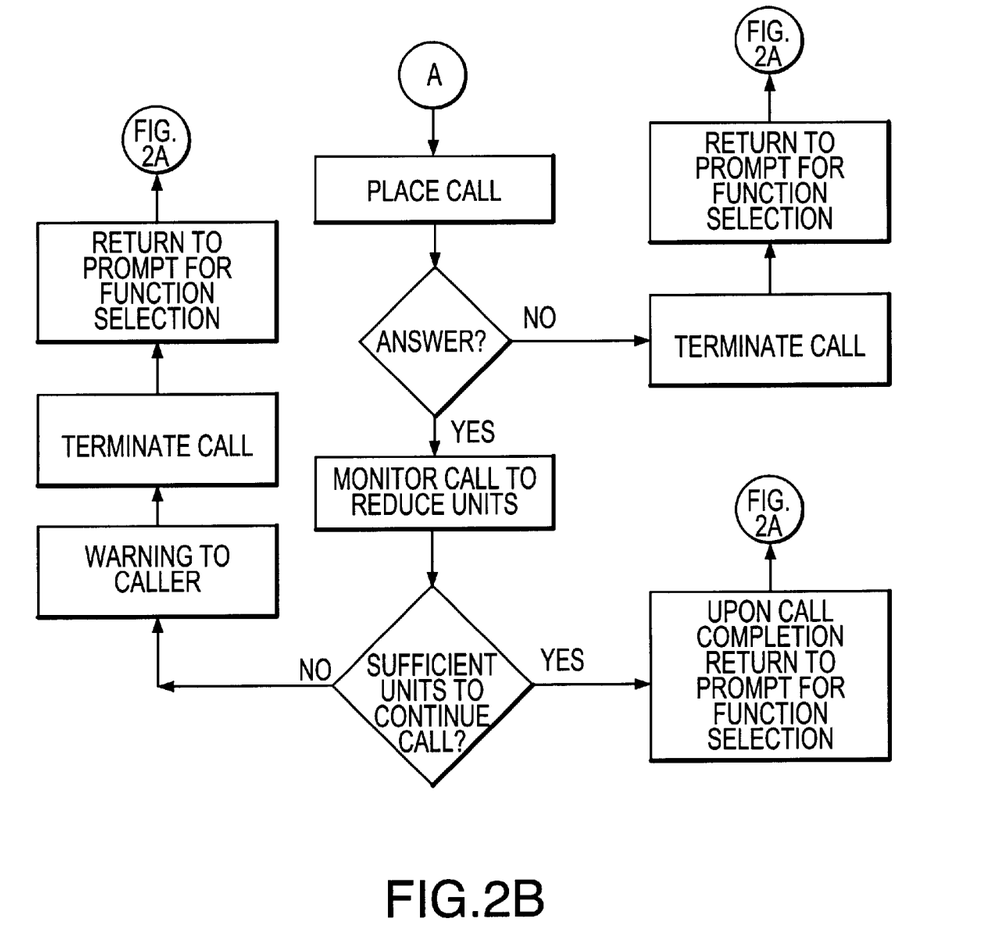

Operation of the originating phone 10 and system embodiment of FIGS. 1A and 1B, respectively, will now be explained with reference to the process flow diagram illustrations of FIGS. 2A–2B. In particular, a customer initially inserts a smart card into phone 10. In response, the chip transceiver 32 may interface with a security access module 34, wherein the chip transceiver 32 may utilize a proprietary access code or protocol to access the data loaded in the microchip embedded within the inserted smart card. In this regard, processor 36 may control the operation for the interface between chip transceiver 32 and security access modules 34 so that each of the security access modules 34 sequentially interface with chip transceiver 32 until the appropriate corresponding security access module 34 is utilized (i.e. so as to access the inserted card utilizing a proprietary protocol). Alternatively, an identifying mechanism may be included in the inserted smart card to automatically identify the appropriate security access module 34 to be employed.

Upon gaining access, the microchip within the inserted smart card chip transceiver 32 may then read encoded information from the microchip (i.e., a preregistered, or "correct", PIN #, a financial institution identifier, and an individual account identifier). Alternatively, and/or additionally, such information may be read by strip reader 30 from a magnetic strip on the smart card inserted into card reader 22. After reading the PIN # from the smart card, the originating phone 10 may then prompt the customer on the LED interface 24 to enter a PIN # utilizing user input pad 28a. Upon entry of a PIN #, the processor 36 may then determines if the PIN # entered corresponds with the PIN # read from the smart card. If not, the phone 10 may display a message on LED interface 24 indicating that an incorrect number was entered and may reprompt the customer to re-enter the "correct" PIN #. Alternatively, or after a given number of unsuccessful re-entry attempts, processor 36 may cause the transaction to be terminated.

If the correct PIN # is input by the customer, originating phone 10 is then operable to prompt a customer via interface 24 to select a desired function (e.g., utilizing input devices 28a or 28b). In this regard, LED display 24 may provide the customer with a menu of function selections, including:

1) placement of smart card telephone call.
 2) purchase transaction to obtain additional smart card units.
 3) termination of transaction.

In the event that a customer selects a smart card call corresponding with item 1 noted above, the originating phone 10 will then prompt the customer (e.g., via LED interface 24) to enter the telephone number to be dialed. Upon entry of the number, the processor 36 will determine whether the microchip of the inserted smart card is loaded with sufficient smart card units to pay for the call (i.e., via the access provided to the microchip by the corresponding access security module 34 and chip transceiver 32). If not, LED interface 24 will display an appropriate message to the customer and the customer may thereafter return to the prompt for function selection. In the event that sufficient smart card units are loaded on the smart card microchip to cover placement of the call, originating phone 10 may then initiate a call to an end station corresponding with the number inputted by the customer via use of call switch 42 and interface with the public switching network 140 in a conventional manner. In conjunction with such call, processor 36 may operate so as to monitor the call on an ongoing basis to determine if sufficient smart card units are available to pay for the telephony access time. If at any point during a call, processor 36 determines that there may be insufficient smart card units available to complete the call, processor 36 may cause a warning signal to be communicated to the customer (e.g., via LED display 24). Further, upon depletion of the available smart card units, processor 36 may terminate the call. If this should occur, the customer can be provided with the option to return to the above-noted prompt for function selection input. As will be appreciated, the appropriate, corresponding security access module 34 may access the microchip of the inserted smart card on a predetermined basis in order to debit, or "unload", smart card calling units from the microchip in corresponding relation to the telephony access provided at phone 10.

Figure 2C:
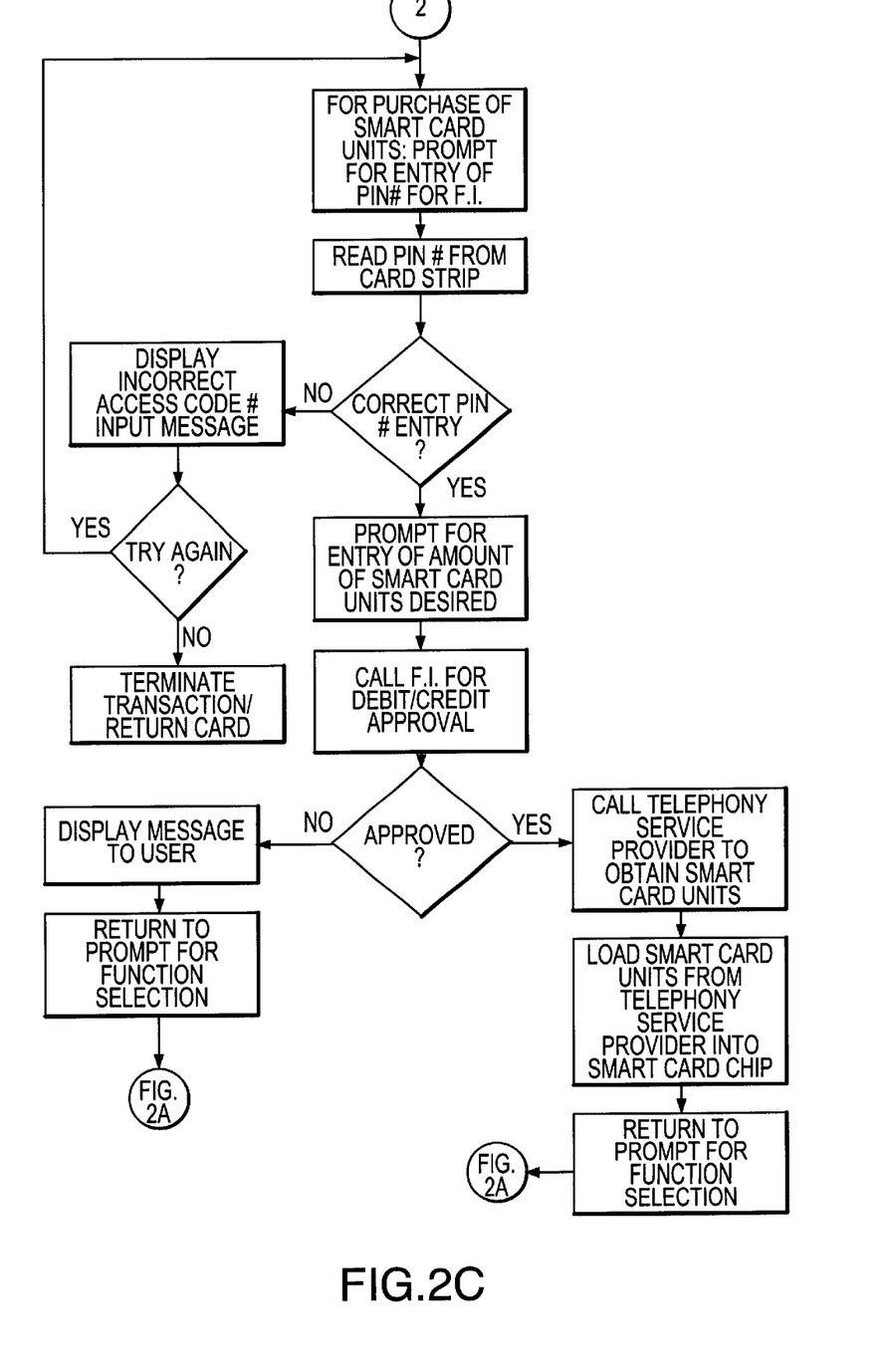
Figure 2D:
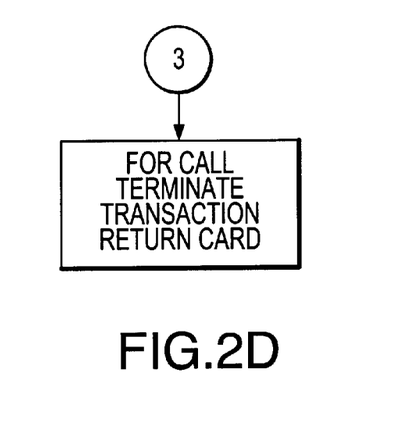

In the event that a customer, upon being prompted to enter a function selection, desires to purchase additional smart card units, processor 36 may then cause LED interface 24 to prompt a user to enter a particular PIN # for the financial institution debit/credit account to be utilized in making the purchase transaction. As will be appreciated, such step may not be necessary if the PIN # previously utilized at the outset of the transaction is the same as that utilized for access to the financial institution account for the given customer. Next, processor 36 may cause LED interface 24 to prompt the customer to input the desired amount or denomination of smart card units to be purchased. Upon entry of such amount, processor 36 may also prompt the customer to select a specific account against which the purchase transaction is to be processed (e-g., in the event of a debit card, the customer may specify which of a checking or savings account is to be utilized).

Upon entry of the above-noted information, processor 36 will cause phone 10 to launch a purchase transaction authorization request via call switch 40 to the transaction services network 120. More particularly, processor 36 will generate a purchase transaction authorization request record comprising at least the account number corresponding with the smart card being utilized, the corresponding financial institution identifier, and the desired purchase amount. The transaction services network 120 will receive the purchase transaction request and respond thereafter pursuant to interface with the appropriate banking institution or credit card service provider. More particularly, a message will be transmitted from transaction services network 120 back to originating phone 10 indicating whether the requested purchase transaction is authorized or denied. If authorized, an authorization number will be associated with the purchase transaction record for storage in memory module 38 at phone 10 for subsequent settlement purposes. In the event the purchase transaction is not authorized, processor 36 may cause LED interface 24 to display an appropriate message to the customer.

In the event that the purchase transaction is authorized, processor 36 will automatically cause call switch device 42 to call the predetermined number (e.g., a 1-800-xxx-xxxx number) corresponding with predetermined switch 152 at the central office 150. Upon receipt of such call at the central office switch 152 (e.g., an AIN-capable switch), call processing will be suspended and a message will be sent to the smart card service control point 160. Such message may include a smart card account number (e.g., read from the accessed microchip and/or read from a magnetic strip on the inserted smart card), and the denomination of smart card units authorized. In response, service manager 162 will interface with the smart card database 164 for logging the purchased smart card units against the corresponding smart card account together with other appropriate transaction data. Service manager 162 will then transmit a message back to originating phone 10 via predetermined switch 152 which enables processor 36 to utilize the corresponding security access module 34 to load the purchased smart card telephony access units into the microchip of the smart card inserted at card reader 22. Upon transmission of the smart card unit data from smart card service control point 160, service manager 162 may then transmit an appropriate message to predetermined switch 162 so as to terminate the call.

Upon loading of the smart card units onto a smart card, processor 36 may then prompt a user via LED interface 24 as to completion of the transaction, and for the entry of a further desired function selection as discussed hereinabove.

The embodiment description provided above is for purposes of illustration only. The various aspects and features of the present invention can be applied in a variety of other embodiments. Such embodiments are intended to be within the scope of the present invention as defined by the claims which follow.

What is claimed is:

1. A public telephone for providing telephony service access responsive to the use of any of a plurality of types of smart cards, each of said plurality of types of smart cards corresponding with a different one of a plurality of financial institutions and having a corresponding, data-containing microchip embedded therein, comprising:
   a plurality of security access modules for enabling access to data in said microchips in each of said plurality of types of smart cards;and
   a transceiver for interfacing with said microchips embedded in each of said plurality of types of smart cards, wherein said tranceiver sequentially interconnects with a number of the plurality of security access modules until a corresponding security module is identified which provides for accessing a particular one of said plurality of types of smart cards.

2. A public telephone as claimed in claim 1, further comprising:
   a first communications switch for interface communications with a transaction services network to obtain authorization of a given smart card purchase transaction request from a corresponding one of said plurality of different financial institutions.

3. A public telephone as claimed in claim 2, further comprising:
   a second communications switch, responsive to a given authorized smart card purchase transaction request, for interface communications with a smart card service control point in a telephony service network.

4. A public telephone as claimed in claim 3, further comprising:
   a processor for controlling said interface communications, wherein pursuant to said interface with said smart card service control point, said processor is operable to cause said transceiver to add telephony service credit units into a microchip of a smart card in an amount corresponding with said given authorized smart card purchase transaction request.

5. A public telephone as claimed in claim 1, further comprising:
   a user interface for prompting a user to select one of a plurality of functions, including:
      placement of a telephony call utilizing smart card credit units stored in a smart card microchip to cover charges; and
      purchase of additional smart card calling units.

6. A public telephone as claimed in claim 5, said user interface comprising:
   a visual display for displaying information to a user.

7. A public telephone as claimed in claim 1, wherein said plurality of security access modules are provided in one-to-one relation with each of said plurality of financial institutions.

8. A public telephone as claimed in claim 1, wherein each of said security access modules comprises proprietary code information for accessing data in a corresponding one of said plurality of types of smart cards.

9. A public telephone as claimed in claim 1, further comprising:
   a first communications switch for interface communications with a transaction services network to obtain authorization of a given smart card purchase transaction request from a corresponding one of said plurality of different financial institutions;
   a second communications switch, responsive to a given authorized smart card purchase transaction request, for interface communications with a smart card service control point in a telephony service network; and
   a processor for controlling said interface communications.

10. A public telephone as claimed in claim 9, further comprising:
    a user interface for prompting and allowing a user to select one of a plurality of functions, including:
       placement of a telephony call utilizing smart card credit units stored in a smart card microchip to cover charges; and
       purchase of additional smart card calling units.

11. A public telephone as claimed in claim 10, wherein said user interface is also for prompting and allowing a user to input a personal identification number.

12. A method for providing telephony service access at a public telephone responsive to the use of any of a plurality of types of smart cards, each of said plurality of types of smart cards corresponding with a different one of a plurality of financial institutions and having a corresponding, data-containing microchip embedded therein comprising:

providing said public telephone with a plurality of security access modules for accessing data in microchips embedded in a corresponding plurality of types of smart cards;

scanning the data-containing microchip through use of a transceiver device;

sequentially establishing a connection with a number of the plurality of security access modules until a corresponding security access module is identified; and utilizing said corresponding security access module to access data in a microchip embedded in a given smart card.

13. A method as claimed in claim 12, further comprising:

identifying another of said plurality of security access modules to access data in a microchip embedded in another given smart card.

14. A method as claimed in claim 12, further comprising:

employing said accessed data to complete a telephony call.

15. A public telephone as claimed in claim 14, further comprising:

modifying said accessed data in connection with said telephony call to unload smart card units from the microchip of said given smart card.

16. A method as claimed in claim 12, further comprising:

employing said accessed data to complete a purchase authorization request for transmission to one of said plurality of financial institutions, said one financial institution having authorized said given smart card;

obtaining authorization for loading smart card units from a telephony service provider; and modifying said accessed data to load additional smart card units onto the microchip of said given smart card.

17. A method as claimed in claim 16, further comprising:

prompting a caller to input personal identification information; and comparing said input personal identification information with personal identification information comprising said accessed data.

18. A method as claimed in claim 16, further comprising:

transmitting said purchase authorization request using a first communications switch at said public telephone to said one of said plurality of financial institutions via a transaction services network;

receiving a transaction authorization message at said public telephone corresponding with said purchase authorization request;

automatically initiating a telephony call using a second communications switch comprising said public telephone, said telephony call being directed to a predetermined central office switch comprising a telephony network, wherein said predetermined central office switch corresponds with said smart card telephony service provider.

19. A method as claimed in claim 18, said obtaining step comprising:

transmitting a smart card authorization message to said public telephone from a smart card service control module comprising said telephony network and corresponding with said predetermined central office switch.

20. A method as claimed in claim 12, wherein at least two of said plurality of types of smart cards correspond with different smart card telephony service providers, and further comprising:

initiating a telephony call at said public telephone to one of at least two predetermined central office switches comprising a telephony network, said two predetermined central office switches corresponding with two different smart card telephony service providers, and wherein predetermined telephone numbers corresponding with each of said two central office switches are stored in a memory device at said public telephone; and obtaining authorization for loading smart card units into said microchip of said given smart card pursuant to receipt of said telephony call at said one predetermined central office switch.

\* \* \* \* \*